United States Patent
Portier et al.

(10) Patent No.: US 11,951,700 B2
(45) Date of Patent: Apr. 9, 2024

(54) METHOD FOR ENCAPSULATING ELECTRONIC DEVICES

(71) Applicant: COMPAGNIE GENERALE DES ETABLISSEMENTS MICHELIN, Clermont-Ferrand (FR)

(72) Inventors: Guillaume Portier, Clermont-Ferrand (FR); Nicolas Eyroulet, Clermont-Ferrand (FR); Claude Lallement, Clermont-Ferrand (FR); Baptiste Forichon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 359 days.

(21) Appl. No.: 17/602,587

(22) PCT Filed: Apr. 9, 2020

(86) PCT No.: PCT/EP2020/060131
§ 371 (c)(1),
(2) Date: Oct. 8, 2021

(87) PCT Pub. No.: WO2020/208132
PCT Pub. Date: Oct. 15, 2020

(65) Prior Publication Data
US 2022/0176663 A1   Jun. 9, 2022

(30) Foreign Application Priority Data
Apr. 11, 2019  (FR) ..................................... 1903889

(51) Int. Cl.
*B29D 30/00* (2006.01)
*B29C 70/72* (2006.01)
(Continued)

(52) U.S. Cl.
CPC .......... *B29D 30/0061* (2013.01); *B29C 70/72* (2013.01); *B60C 23/0493* (2013.01); *G06K 19/07764* (2013.01); *B29D 2030/0077* (2013.01)

(58) Field of Classification Search
CPC ....................................................... B29C 70/72
(Continued)

(56) References Cited

U.S. PATENT DOCUMENTS 8,783,321 B2    7/2014  Sevaille et al.
2005/0101060 A1*  5/2005  Tsunoda ........... G06K 19/07764
                                                361/728
(Continued)

FOREIGN PATENT DOCUMENTS

EP   1522957 A1    4/2005
JP   2000-108619 A  4/2000
WO   2010/007283 A1  1/2010

OTHER PUBLICATIONS

International Search Report dated Jun. 5, 2020, in corresponding PCT/EP2020/060131 (4 pages).

*Primary Examiner* — Seyed Masoud Malekzadeh
*Assistant Examiner* — Xinwen Ye
(74) *Attorney, Agent, or Firm* — VENABLE LLP (57) ABSTRACT

A method for encapsulating electronic devices comprises, successively, placing a profiled strip on a conveyor belt, the profiled strip comprising a base, at least one flap protruding with respect to said base; positioning an electronic device, in the longitudinal direction, on the receiving zone of the profiled strip; and plastically deforming the flap by application of an application force in a predetermined direction.

15 Claims, 3 Drawing Sheets

(51) Int. Cl.
*B60C 23/04* (2006.01)
*G06K 19/077* (2006.01)

(58) Field of Classification Search
USPC .......................................................... 264/272
See application file for complete search history.

(56) References Cited

U.S. PATENT DOCUMENTS

2008/0121724 A1   5/2008   Beer et al.
2011/0284155 A1*  11/2011  Sevaille ............... B29C 70/685
                                                156/543

* cited by examiner

METHOD FOR ENCAPSULATING ELECTRONIC DEVICES

TECHNICAL FIELD OF THE INVENTION

The present invention relates to methods for encapsulating electronic devices, in particular electronic devices intended to be integrated into rubber articles.

PRIOR ART

It is commonplace to integrate into a tyre an electronic device comprising for example a passive radiofrequency identification transponder. This type of transponder is generally known by the acronym RFID. Such an electronic device can store data, for example relating to the tyre.

In order to improve the quality of transmission of the data stored in the electronic device, it is commonplace to encapsulate it beforehand in rubber. This is because, generally speaking, the higher the dielectric constant of the rubber mass encapsulating the electronic device, the more the electrical signal received and transmitted by the electronic device is attenuated. Given that the dielectric constants of the rubbers generally used to manufacture tyres are high, the transmission of the data is greatly improved when the dielectric constant of the rubber encapsulating the electronic device is low.

Moreover, the prior encapsulation of the device makes it possible to protect it while it is being stored before being incorporated into a tyre.

Various methods for manufacturing a semifinished product comprising an electronic device encapsulated in rubber are known from the prior art.

For example, the document WO2010/007283 proposes a method for manufacturing at least one semifinished product comprising at least one electronic device encapsulated in rubber, wherein the device is brought into contact with a first rubber strip and it is covered with a second rubber strip so as to encapsulate the device, and in wherein the two strips run substantially at the same speed from a first zone in which the two strips are separate to a second zone in which two respective faces of the two strips are in contact with one another.

Although efficient and effective, this method requires that the rubber strips are aligned and synchronized correctly so that the electronic device is correctly encapsulated and the strips are correctly superposed.

Moreover, it is necessary to ensure that the green tack of the rubber strips is sufficient to keep the electronic device in position until it has been completely encapsulated with rubber.

In the pursuit of its research, the applicant has discovered an encapsulating method that makes it possible to overcome the abovementioned drawbacks.

SUMMARY OF THE INVENTION

The invention, which is described in more detail below, relates to at least one of the embodiments listed in the following points:

1. A method for encapsulating electronic devices, wherein, successively:
   a. a profiled strip is placed on a conveyor belt, the profiled strip comprising a base and, on the opposite face to the face in contact with the conveyor belt, at least one flap protruding with respect to said base, said flap extending in a direction parallel to the running direction of the conveyor belt, referred to as the longitudinal direction, said base comprising a zone referred to as the receiving zone extending along said flap, the conveyor belt comprising, next to the receiving zone and on the opposite face to the face in contact with the profiled strip, a magnetic means;
   b. an electronic device is positioned, in the longitudinal direction, at a regular spacing, on the receiving zone of the profiled strip, said device comprising at least one ferromagnetic material, the magnetic means of the conveyor belt keeping the electronic device in position on the receiving zone;
   c. the flap is plastically deformed by application of an application force in a predetermined direction so as to encapsulate the electronic device.
2. An encapsulating method according to the preceding embodiment, wherein, during step b), the electronic device is positioned at a speed substantially identical and parallel to the running speed of the conveyor belt.
3. An encapsulating method according to either one of the preceding embodiments, wherein the positioning spacing between two electronic devices is adapted such that there is no transverse overlap between two consecutive electronic devices.
4. An encapsulating method according to any one of the preceding embodiments, wherein the application force is between 20 and 500 N, preferably between 50 and 100 N.
5. An encapsulating method according to any one of the preceding embodiments, wherein the projection of the application direction of the application force onto a plane transverse to the longitudinal direction of the conveyor belt, this transverse plane comprising an application point of the application force, forms, with a straight line contained in this transverse plane, an angle of which the value varies over time by plus or minus 45°.
6. An encapsulating method according to any one of the preceding embodiments, comprising, at the end of step c), a step of cutting the profiled strip in a transverse plane that does not comprise an electronic device.
7. An encapsulating method according to any one of the preceding embodiments, wherein the magnetic means is positioned on the conveyor belt on the opposite face to the face in contact with the profiled strip.
8. An encapsulating method according to any one of embodiments 1 to 6, wherein the magnetic means is integrated into the structure of the conveyor belt.
9. An encapsulating method according to any one of the preceding embodiments, comprising a heating means for bringing the profiled strip to a temperature of between 30 and 90° C., preferably between 40 and 80° C., during step c).
10. An encapsulating method according to the preceding embodiment, comprising, before step a), a step of extruding an elastomeric material so as to obtain the profiled strip.
11. An encapsulating method according to any one of the preceding embodiments, wherein the profiled strip comprises two flaps extending parallel to the running direction of the conveyor belt, each flap being able to be plastically deformed by application of an application force in a predetermined direction, so as to at least partially encapsulate the electronic device between said base and said flap, the two flaps interacting so as to totally encapsulate the electronic device between said base and said flaps.

12. An encapsulating method according to the preceding embodiment, wherein the receiving zone of the profiled strip is limited transversely by the junction between the flaps and the base.
13. An encapsulating method according to any one of the preceding embodiments, wherein the width of the profiled strip is at most equal to 40 mm, preferably greater than 3 mm, and in a preferred manner between 10 and 25 mm.
14. An encapsulating method according to any one of the preceding embodiments, wherein the elastomeric material of the profiled strip exhibits a Mooney plasticity in the raw state of between 30 and 90 Mooney Units (MU), preferably between 50 and 70 MU.
15. An encapsulating method according to any one of the preceding embodiments, wherein the elastomeric material of the profiled strip is an electrical insulator, preferably with a dielectric constant at 915 MHz of less than 6.5.
16. An encapsulating method according to any one of the preceding embodiments, wherein the electronic device is a radiofrequency transponder.
17. An encapsulating method according to the preceding embodiment, wherein the communication frequency of the radiofrequency transponder is situated in the UHF band between 300 MHz and 3 GHz, preferably in the narrow frequency band between 860 MHz and 960 MHz, and very preferably in very narrow bands of 860 MHz to 870 MHz and 915 MHz to 925 MHz.

DEFINITIONS

Vertical means, as commonly accepted, in the direction of gravity. Horizontal means perpendicularly to vertical.

The compounds comprising carbon mentioned in the description may be of fossil or biobased origin. In the latter case, they may be partially or completely derived from biomass or be obtained from renewable starting materials derived from biomass. They are in particular polymers, plasticizers, fillers, etc.

The Mooney plasticity measurement is carried out according to the following principle and in accordance with standard ASTM D-1646. The composition or the elastomer, which is generally raw, is moulded in a cylindrical chamber heated to a given temperature, usually 100° C. After preheating for one minute, a rotor of L type rotates within the test specimen at 2 revolutions per minute and the working torque for maintaining this movement is measured after rotating for 4 minutes. The Mooney plasticity (ML 1+4) is expressed in "Mooney units" (MU, where 1 MU=0.83 newton·metre).

DESCRIPTION OF THE FIGURES

A one-piece profiled strip (1) comprises a base (2) comprising a receiving zone (4) for the electronic device and a flap (3). The one-piece profiled strip (1) in FIG. 1.*a* comprises one flap (3), while the one-piece profiled strips (1) shown schematically in FIGS. 1.*b* to 1.*d* each comprise two flaps (3).

FIG. 2 schematically shows a method for encapsulating an electronic device according to the invention. A one-piece profiled strip (1) is positioned on a plane. An electronic device (5) is positioned in the receiving zone. An application force is applied to the flap via a pulley (6) mounted so as to be able to rotate about its axis of rotation (7) in order to deform the flap and partially encapsulate the electronic device. An application force is then applied to the second flap in a similar manner (not shown), the two flaps interacting so as to totally encapsulate the electronic device.

The electromagnetic conduction of such an antenna occurs mainly via a skin effect, meaning that it mainly occurs in the outer layers of the antenna. This skin thickness is dependent in particular on the frequency of the radiation and on the material from which the conduction layer is made. By way of example, for a UHF frequency (for example 915 MHz), the skin thickness is about 2.1 μm for silver, 2.2 μm for copper, and 4.4 μm for brass.

The steel wire may be coated with these layers and then shaped; alternatively, it may also be shaped and then coated.

The helical spring is defined primarily by a winding diameter of the coated wire and a helix pitch. Thus, an inside diameter 13 and outside diameter 15 of the helical spring are precisely determined taking the diameter of the wire into account. The length of the spring 17 corresponds here to the half-wavelength of the transmission signal of the radiofrequency transponder 1 in a rubber mass. It is thus possible to define a median plane 19 of the helical spring perpendicular to the axis of revolution 11 separating the radiating antenna into two equal parts. This plane is in the middle of the central zone 16 of the radiating antenna, this central zone 16 corresponding to about 25% of the total length of the antenna, and preferably 15%.

FIG. 4 shows the electronic part 20 of a radiofrequency transponder 1 intended for a configuration in which the electronic part 20 is situated inside the radiating antenna 10. The electronic part 20 comprises an electronic chip 22 and a primary antenna 24 electrically connected to the electronic chip 22 via a printed circuit board 26. The primary antenna is made up here of an SMD (surface-mount-device) microcoil having an axis of symmetry 23. The median plane 21 of the primary antenna, which is defined by a normal parallel to the axis of symmetry 23 of the SMD coil and separates the coil into two equal parts, is determined. The electrical connection between the components on the printed circuit board is realized using copper tracks terminated by copper pads 27. The electrical connection of the components on the printed circuit board is realized with the aid of the wire-bonding technique using gold wires 28 between the component and the pads 27. The assembly made up of the printed circuit board 26, the electronic chip 22 and the primary antenna 24 is embedded in a rigid mass 29 of electrically insulating high-temperature epoxy resin forming the electronic part 20 of the radiofrequency transponder 1.

DETAILED DESCRIPTION

Figure 1:
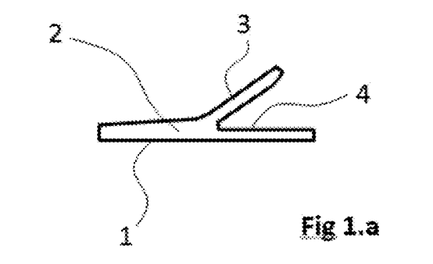
FIG. 1, which comprises Subfigures 1.*a* to 1.*d*, schematically shows, in a non-limiting manner, four cross sections of one-piece profiled strips according to the invention. The elements are numbered identically in each subfigure.
Figure 2:
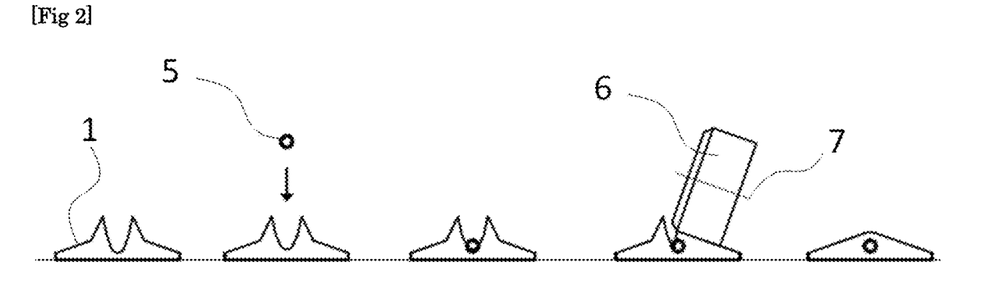
Figure 3:
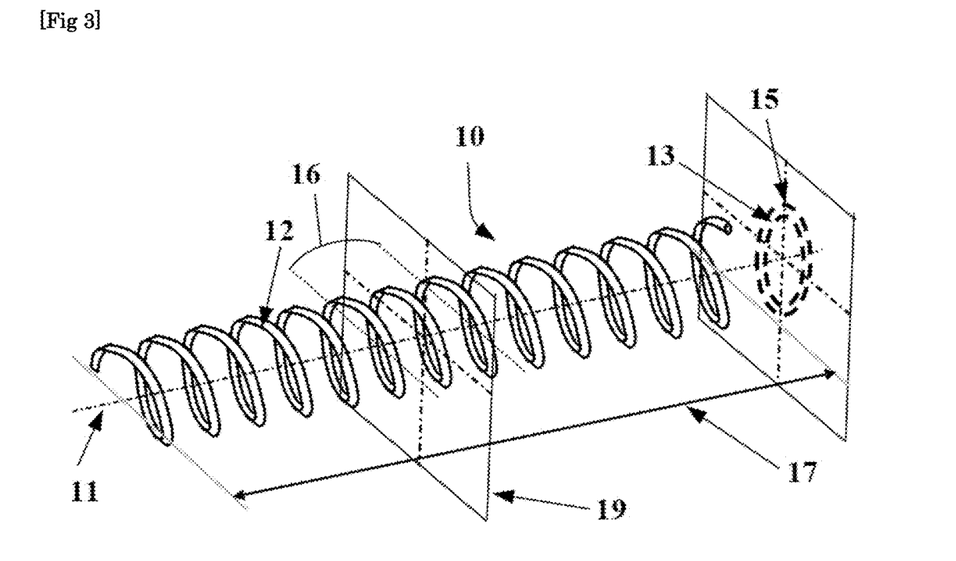
FIG. 3 shows a radiating antenna 10 made up of a steel wire 12 that has been plastically deformed in order to form a helical spring having an axis of revolution 11. This steel wire is coated with a conduction layer made of copper, aluminium, silver, gold, copper, tin, zinc or brass, covered if necessary with a chemically insulating layer made for example of brass, zinc, nickel or tin in order to protect the elastomeric material from the material of the conduction layer.
Figure 4:
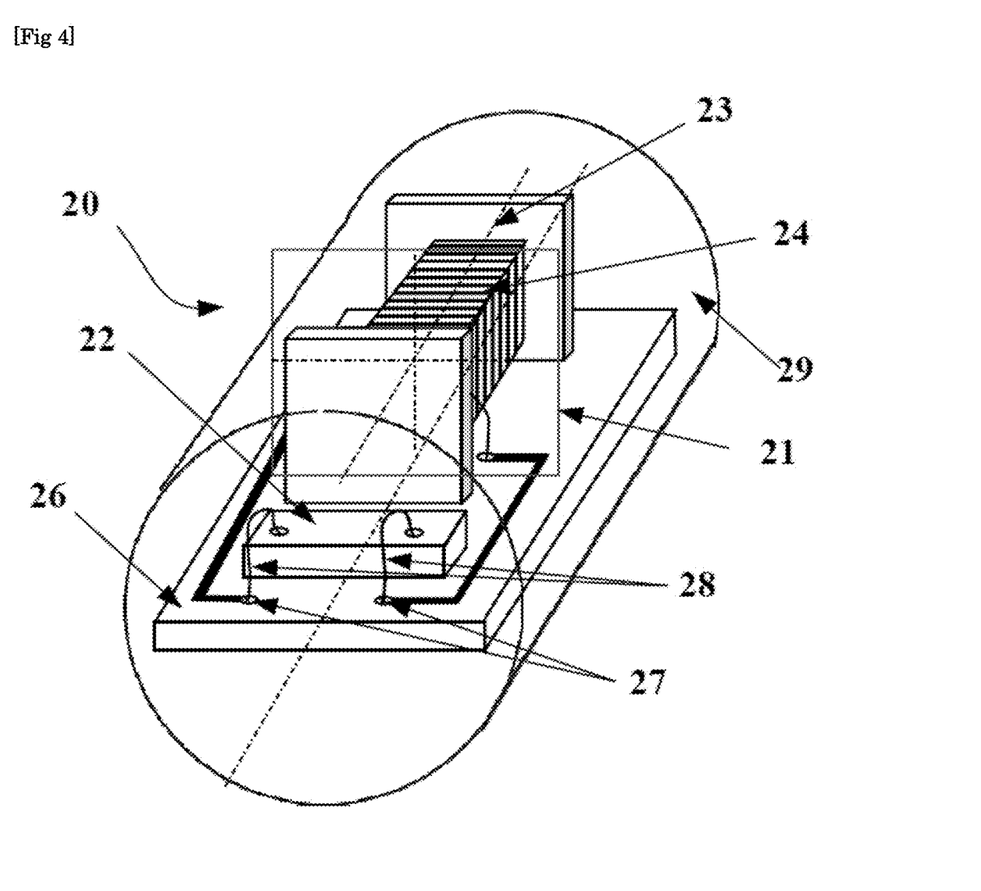
Figure 5:
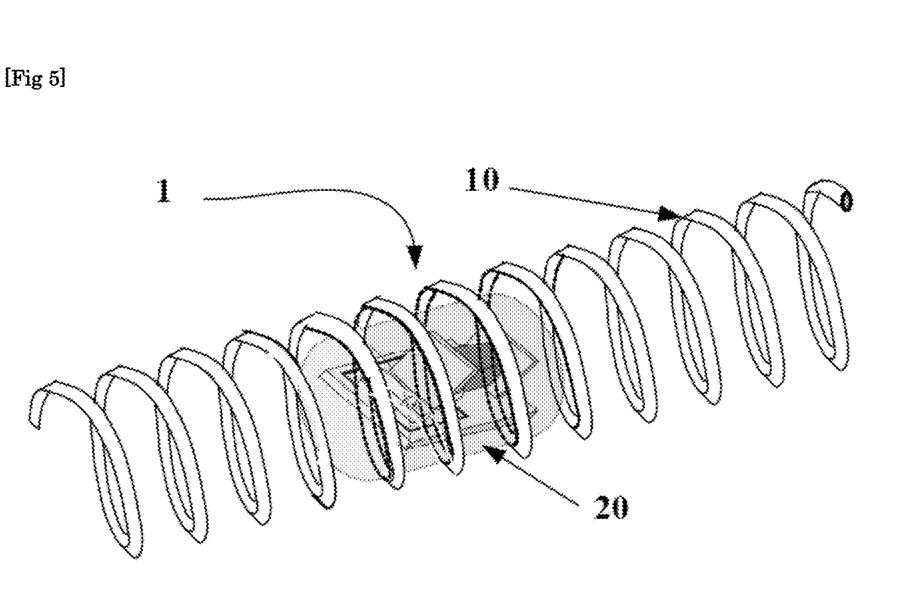
FIG. 5 shows a radiofrequency transponder 1 in a configuration in which the electronic part 20 is situated inside the radiating antenna 10. The geometric shape of the electronic part 10 is circumscribed by a cylinder, the diameter of which is smaller than or equal to the inside diameter 13 of the helical spring. This makes it easier for the electronic part 20 to be inserted into the radiating antenna 10. The median plane 21 of the primary antenna is located in the central zone of the radiating antenna and substantially superposed on the median plane 19 of the radiating antenna 10.

The subject of the invention is a method for encapsulating electronic devices (5), wherein, successively:

a. a profiled strip (1) is placed on a conveyor belt, the profiled strip comprising a base (2) and, on the opposite face to the face in contact with the conveyor belt, at least one flap (3) protruding with respect to said base (2), said flap (3) extending in a direction parallel to the running direction of the conveyor belt, referred to as the longitudinal direction, said base (2) comprising a zone referred to as the receiving zone (4) extending along said flap (3), the conveyor belt comprising, next to the receiving zone (4), a magnetic means;

b. an electronic device (5) is positioned, in the longitudinal direction, at a regular spacing, on the receiving zone (4) of the profiled strip (1), said device (5) comprising at least one ferromagnetic material, the magnetic means of the conveyor belt keeping the electronic device (5) in position on the receiving zone (4);

c. the flap (3) is plastically deformed by application of an application force in a predetermined direction so as to encapsulate the electronic device (5).

Step a) of the method according to the invention consists in positioning a profiled strip on a conveyor belt. The profiled strip can be positioned on a conveyor belt directly at the outlet of an extruder for obtaining said profiled strip, or from a storage means, for example a reel or any other appropriate means.

Thus, in a preferred manner, the encapsulating method according to the invention comprises, before step a), a step of extruding an elastomeric material so as to obtain the profiled strip. The flap can be obtained directly upon extrusion by a suitable nozzle shape, or be created by cutting the one-piece profiled strip obtained by extrusion. The cut can be made for example with the aid of cutting means disposed after the nozzle in the direction of extrusion.

The profiled strip is positioned on the conveyor belt such that the receiving zone is accessible in order that the electronic device can be positioned during step b).

The method according to the invention comprises a step b) in which an electronic device is positioned on the receiving zone of the profiled strip, said device comprising at least one ferromagnetic material, the magnetic means of the conveyor belt keeping the electronic device in position on the receiving zone.

A device is positioned on the receiving zone by placement means which can be any placement means suitable for the electronic device. Such means can be for example a manipulator arm comprising magnetic or mechanical means that are able to be activated or deactivated in order to take hold of and transport an electronic device from a storage zone to the receiving zone of the profiled strip and then to let go of the device once the latter has been positioned on the receiving zone.

In a preferred manner, the electronic device is positioned at a speed substantially identical and parallel to the running speed of the conveyor belt. This allows the relative speed of the device with respect to the profiled strip to be substantially zero during the placement of the device. Thus, this reduces the risk of this placement step damaging the electronic device or the profiled strip as a result of an impact caused by a difference in speed.

The magnetic means disposed next to the receiving zone of the profiled strip makes it possible to keep the electronic device, which comprises at least one ferromagnetic material, in position on the receiving zone until the device is encapsulated in rubber. Thus, the electronic device can be positioned correctly even in the case of misalignment of the placement means, making it possible to limit the number of instances of incorrect positioning.

In a preferred arrangement, the magnetic means of the conveyor belt is positioned on the opposite face to the face in contact with the profiled strip. In another preferred arrangement, the magnetic means is integrated into the structure of the conveyor belt.

In a preferred manner, the regular positioning spacing between two electronic devices is adapted such that there is no transverse overlap between two consecutive electronic devices.

The method according to the invention then comprises a step c) during which the flap(s) is/are plastically deformed by application of an application force in a predetermined direction so as to totally encapsulate the electronic device. In a preferred manner, the application force is between 20 and 500 N, preferably between 50 and 100 N.

According to the invention, the application of an application force in a predetermined direction makes it possible to plastically deform the flap such that it at least partially covers the electronic device.

A "predetermined direction" is understood to mean that the application direction of the application force is determined depending on the shape of the flap and the longitudinal direction of the conveyor belt so as to allow the plastic deformation of the flap in order that it at least partially encapsulates the electronic device.

This direction is substantially constant over time. Constant means that the projection of the application direction of the application force onto a plane transverse to the longitudinal direction of the conveyor belt, this transverse plane comprising an application point of the application force, forms, with a straight line contained in this transverse plane, an angle of which the value varies over time by plus or minus 45°, preferably by plus or minus 35°, in a preferred manner by plus or minus 25°, very preferably by plus or minus 15°, in a very preferred manner by plus or minus 10°, even more preferably by plus or minus 5° and in a very preferred manner by a value less than or equal to the angle measurement error. This straight line contained in the transverse plane is chosen in an arbitrary manner and is used as a reference for measuring the angle formed between this straight line and the projection of the application direction of the application force onto a plane transverse to the longitudinal direction of the conveyor belt.

The application force is applied to the, or each, flap by application means such as, for example, a cylindrical wheel mounted so as to be able to rotate, the width of which, in other words the height of the cylinder or edge face width, is adapted to the size of the flap. Profiles of non-cylindrical wheels adapted to the profiled element can also be used.

The means for applying the application force can be made up of at least one cylindrical wheel mounted so as to be able to rotate, the axis of rotation of the wheel being substantially perpendicular to the running direction of the conveyor belt and positioned close to the conveyor belt such that, during running, the flap comes into contact with the edge face of the wheel. By application of an application force in a predetermined direction, the flap is plastically deformed during running so as to at least partially encapsulate the electronic device. The number of wheels and the position thereof are adapted depending on the number of flaps and the position thereof.

In a preferred manner, the method according to the invention comprises a heating means for bringing the profiled strip to a temperature of between 30 and 90° C., preferably between 40 and 80° C., during step c). This temperature allows optimal plastic deformation of the flap(s). The profiled strip can be heated just before step c), or before any one of the steps of the method according to the invention. The temperature of the strip can be measured about the application point of the application force, preferably at a distance of between 0 and 100 mm from the application point of the application force.

In a preferred manner, the method according to the invention comprises, at the end of step c), a step of cutting the profiled strip in a transverse plane that does not comprise an electronic device.

In a preferred arrangement, the profiled strip is fed continuously. The cutting step is carried out in order to separate the strip into modules that each comprise an electronic device. The interval between two consecutive cutting planes, in other words the length of a module, is preferably less than or equal to 100 mm and in a preferred manner between 50 and 70 mm.

The spacing between two consecutive devices positioned during step b) is adapted such that there is no overlap between two consecutively positioned devices and such that, following cutting, the device is totally encapsulated in the cut module, meaning that no part of said device emerges from said module. Monitoring means can be used to verify that the cutting step has not caused any part of the electronic device to be visible or to emerge.

One-Piece Profiled Strip

The one-piece profiled strip is preferably obtained by extrusion of an elastomeric material. One-piece means that the profiled strip is obtained without assembling elements, in particular without assembly following extrusion.

A strip means, in a well-known manner, a shape in which one of the dimensions, the length, is greater than the other dimensions, for example at least greater by a factor of 2.

For this profiled strip, a longitudinal direction is defined as being the direction parallel to the length of the strip, preferably parallel to the direction of extrusion of the one-piece profiled strip. A transverse plane means the plane perpendicular to the longitudinal direction. For the conveyor belt, a longitudinal direction is defined that corresponds to the running direction of the conveyor belt. According to the invention, the longitudinal direction of the conveyor belt and the longitudinal direction of the profiled strip are coincident when the profiled strip is positioned on the conveyor belt.

The one-piece profiled strip comprises two edges that extend longitudinally and substantially parallel to one another. For this strip, a width is defined that is measured in the projection of said strip onto a horizontal plane in the transverse direction. In a preferred manner, the one-piece profiled strip has a width at most equal to 40 mm, preferably greater than 3 mm, and in a preferred manner between 10 and 25 mm.

The base of the one-piece profiled strip according to the invention comprises a receiving zone for the electronic device. The receiving zone means a zone designed to receive the electronic device. The receiving zone may comprise a groove extending in the longitudinal direction of the profiled strip, with dimensions suitable for receiving the electronic device. Such a groove makes it possible to precisely position the electronic device on the receiving zone and to keep it in position, in cooperation with the magnetic means of the conveyor belt, until the flap has been deformed so as to encapsulate said device in the one-piece profiled strip.

The one-piece profiled strip comprises at least one flap that protrudes with respect to said base and that can be plastically deformed by application of an application force in a predetermined direction so as to encapsulate the electronic device between said base and said at least one flap.

In the rest of the description, the expression "the flap" denotes the flap of the profiled strip if the latter comprises only one flap, or all of the flaps of the profiled strip according to the invention if the latter comprises a plurality of flaps. In the latter case, the expression "the flap" should therefore be implicitly understood herein as meaning "the flaps".

Thus, when the flap is deformed by application of an application force in a predetermined direction, the electronic device positioned on the receiving zone is totally encapsulated, that is to say totally covered by the flap. In other words, the electronic device is embedded in the rubber mass formed by the base and the plastically deformed flap.

The flap extends parallel to the longitudinal direction of the profiled strip.

In a preferred arrangement, the one-piece profiled strip comprises two flaps extending parallel to the longitudinal direction of the profiled strip, each flap being able to be plastically deformed by application of an application force in a predetermined direction, so as to at least partially encapsulate an electronic device between said base and said flap, the two flaps interacting so as to encapsulate an electronic device between said base and said flaps.

In a preferred manner, in this arrangement, the receiving zone is limited transversely by the junction between the flaps and the base of the profiled strip, meaning that the flaps are disposed on either side of the receiving zone in the transverse direction. Thus, the presence of the flaps makes it possible to position the electronic device even more precisely in the transverse direction.

Elastomeric Material

The one-piece profiled strip is made of an elastomeric material that preferably exhibits a Mooney plasticity in the raw state of between 30 and 90 Mooney Units (MU), preferably between 50 and 70 MU. This elastomeric material is preferably an electrical insulator, preferably with a dielectric constant measured at 915 MHz of less than 6.5.

The elastomeric material contains 100 phr (parts by weight per 100 parts of elastomer) of an elastomer such as EPDM (ethylene propylene diene monomer rubber), butyl rubber, neoprene or a diene elastomer such as SBR (styrene-butadiene rubber), polybutadiene, natural rubber or polyisoprene.

The elastomeric material comprises fillers such as silica, carbon black, chalk and kaolin:
  with a silica filler in a maximum amount of 50 phr;
  with a carbon black filler of ASTM grade higher than 700, in an amount lower than 50 phr;
  with a carbon black filler of ASTM grade lower than or equal to 500, in a maximum amount of 20 phr.
  it is possible to add or replace these fillers with chalk or kaolin.

When the elastomeric material comprises fillers such as silica, it may also comprise agents for coupling the silica to the elastomers. Such coupling agents are well known to a person skilled in the art. Such amounts and types of fillers make it possible to ensure a relative permittivity, or dielectric constant, lower than 6.5, in particular at a frequency of 915 MHz.

The stiffness in the cured state of the elastomeric material is preferably less than or similar to those of the adjacent compounds when, at the end of the method according to the invention, the assembly made up of a portion of one-piece profiled strip and an electronic device is incorporated in a rubber article.

The electrically insulating elastomeric material preferably has an adhesion promoter for bonding it to the electronic device. This promoter may be a salt of cobalt or nickel, for example cobalt naphthenate in an amount lower than 3 phr and with a suitable amount of sulfur, of about 5 to 7 phr.

Electronic Device

The electronic device may be any type of electronic device. In particular, the electronic device is preferably a passive radiofrequency identification transponder, often identified by the acronym RFID (Radio-Frequency IDentification) and referred to as "radiofrequency transponder" in the following text.

Here, the term "radiofrequency transponder" means that the radiofrequency transponder is interrogated from outside the latter and passively. The interrogation phases therefore do not require the radiofrequency transponder to have its own power supply. The functionality of the radiofrequency transponder is primarily a role of identifying the rubber article in which it is incorporated, for example a tyre casing.

Radiofrequency transponders usually comprise an electronic chip and a radiating antenna that is able to communicate with a radiofrequency reader.

In particular, the communication frequency of the radiofrequency transponder lies in the ultra-high-frequency (UHF) band between 300 MHz and 3 GHz, allowing an advantageous compromise between a small size of the radiating antenna, which is able to be easily integrated in a one-piece profiled element intended for a tyre casing, and a large distance from which the radiofrequency transponder is readable, far away from the tyre casing. Advantageously, the radiofrequency transponder communicates in the narrow frequency band of between 860 MHz and 960 MHz and more specifically in very narrow bands of 860 MHz to 870 MHz and 915 MHz to 925 MHz. This is because, at these frequencies, the conventional elastomer compounds of the tyre casing constitute a good compromise with respect to the propagation of radio waves. In addition, these frequencies are as high as possible in order to minimize the size of the radiating antenna so as to make it easier to integrate the radiofrequency transponder embedded in a rubber patch into the tyre casing.

According to a first embodiment, the radiating antenna has two helical antenna segments and the electronic chip is galvanically connected to the two helical antenna segments.

According to another embodiment, the radiofrequency transponder also comprises a primary antenna electrically connected to the electronic chip, wherein the primary antenna is inductively coupled to the radiating antenna, and wherein the radiating antenna is a dipole antenna made up of a single-strand helical spring.

This second embodiment has the advantage of mechanically separating the radiating antenna from the electronic components of the transponder and thus of eliminating the weak point of conventional transponders, namely the zone in which the antenna segments are fastened to the carrier of the electronic chip.

The invention claimed is:

1. A method for encapsulating electronic devices comprising, successively:
    (a) placing a profiled strip on a conveyor belt,
        the profiled strip comprising a base and, on an opposite face to a face in contact with the conveyor belt, a flap protruding with respect to the base,
        the flap extending in a direction parallel to a longitudinal direction which is a running direction of the conveyor belt,
        the base comprising a receiving zone extending along the flap,
        the conveyor belt comprising, next to the receiving zone and on an opposite face to a face in contact with the profiled strip, a magnetic means;
    (b) positioning an electronic device, in the longitudinal direction, at a regular spacing, on the receiving zone of the profiled strip, the device comprising at least one ferromagnetic material, the magnetic means of the conveyor belt keeping the device in position on the receiving zone; and
    (c) plastically deforming the flap by application of an application force in a predetermined direction so as to encapsulate the device.

2. The encapsulating method according to claim 1, wherein, during step (b), the device is positioned at a speed substantially identical and parallel to a running speed of the conveyor belt.

3. The encapsulating method according to claim 1, wherein a positioning spacing between two devices is adapted such that there is no transverse overlap between two consecutive devices.

4. The encapsulating method according to claim 1, wherein the application force is between 20 and 500 N.

5. The encapsulating method according to claim 1, wherein projection of the predetermined direction of the application force onto a plane transverse to the longitudinal direction of the conveyor belt, the transverse plane comprising an application point of the application force, forms, with a straight line contained in the transverse plane, an angle of which the value varies over time by plus or minus 45°.

6. The encapsulating method according to claim 1, further comprising, at the end of step (c), a step of cutting the profiled strip in a transverse plane that does not comprise a device.

7. The encapsulating method according to claim 1, wherein the magnetic means is positioned on the conveyor belt on the opposite face to the face in contact with the profiled strip.

8. The encapsulating method according to claim 1, wherein the magnetic means is integrated into a structure of the conveyor belt.

9. The encapsulating method according to claim 8, further comprising, before step (a), a step of extruding an elastomeric material so as to obtain the profiled strip.

10. The encapsulating method according to claim 1, wherein the profiled strip comprises two flaps extending parallel to the running direction of the conveyor belt, each flap being able to be plastically deformed by application of an application force in a predetermined direction, so as to at least partially encapsulate the device between the base and the flap, the two flaps interacting so as to totally encapsulate the device between the base and the two flaps.

11. The encapsulating method according to claim 10, wherein the receiving zone of the profiled strip is limited transversely by a junction between the two flaps and the base.

12. The encapsulating method according to claim 1, wherein a width of the profiled strip is at most equal to 40 mm.

13. The encapsulating method according to claim 9, wherein the elastomeric material of the profiled strip exhibits a Mooney plasticity in a raw state of between 30 and 90 Mooney Units.

14. The encapsulating method according to claim 9, wherein the elastomeric material of the profiled strip is an electrical insulator.

15. The encapsulating method according to claim 1, wherein the device is a radiofrequency transponder.

\* \* \* \* \*